United States Patent [19]

Leclercq

[11] Patent Number: 4,636,698
[45] Date of Patent: Jan. 13, 1987

[54] AUTOMATIC DEVICE FOR ACTUATION OF COMPONENTS TO CLEAN A MOTOR VEHICLE WINDOW

[75] Inventor: Jacques Leclercq, Roisel, France

[73] Assignee: Saint-Gobain Vitiage, Aubervilliers Cedex, France

[21] Appl. No.: 779,407

[22] Filed: Sep. 24, 1985

[30] Foreign Application Priority Data

Oct. 4, 1984 [FR] France .................... 84 15249

[51] Int. Cl.$^4$ .................... B60S 1/08
[52] U.S. Cl. .................... 318/443; 318/444; 318/480; 318/DIG. 2; 15/250 C; 219/203
[58] Field of Search .......... 318/443, 444, 480, DIG. 2, 318/483; 15/250 C, 250.05, 250.31, 250.12; 219/203, 522, 547

[56] References Cited

U.S. PATENT DOCUMENTS

| | | | |
|---|---|---|---|
| 3,621,356 | 11/1971 | Kwan Chi On | 318/480 |
| 4,132,881 | 1/1979 | Ciarniello et al. | 15/250 C X |
| 4,317,073 | 2/1982 | Blaszkowski | 318/480 X |
| 4,355,271 | 10/1982 | Noack | 318/480 |
| 4,481,450 | 11/1984 | Watanabe et al. | 318/480 X |
| 4,495,452 | 1/1985 | Boegh-Peterson | 318/DIG. 2 X |

FOREIGN PATENT DOCUMENTS

| | | | |
|---|---|---|---|
| 59-14563 | 1/1984 | Japan | 15/250 C |
| 59-89250 | 5/1984 | Japan | 15/250 C |

Primary Examiner—Bernard Roskoski
Assistant Examiner—Bentsu Ro
Attorney, Agent, or Firm—Pennie & Edmonds

[57] ABSTRACT

An automatic device for actuation of components for cleaning motor vehicle glass which includes a system for detection of the dirtiness of the glass, made up of a measuring photosensitive element receiving light directly through the glass and a reference photosensitive element isolated from any direct light and influenced only by the light transmitted through the interior of the glassing and an electronic circuit to receive and compare the responses of the two photosensitive elements and means to control the cleaning components automatically when the difference is response of these elements exceeds a certain threshold.

13 Claims, 6 Drawing Figures

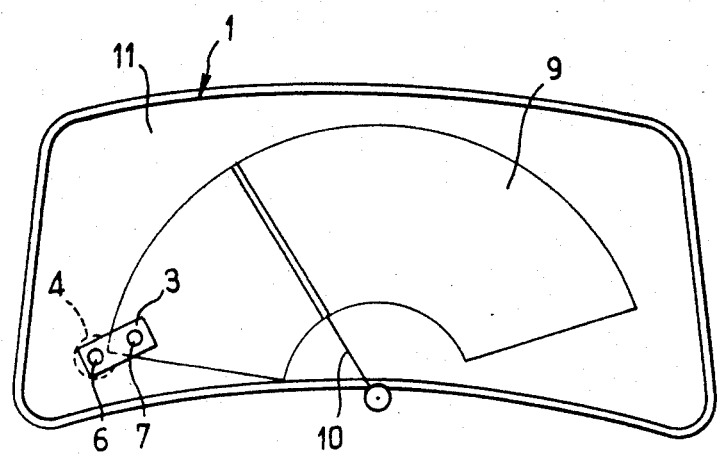
FIG_2
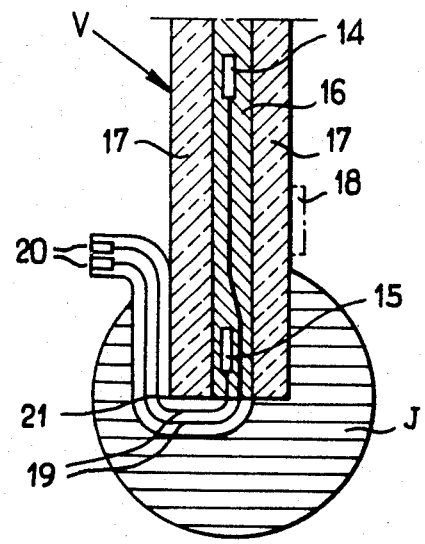
FIG_4
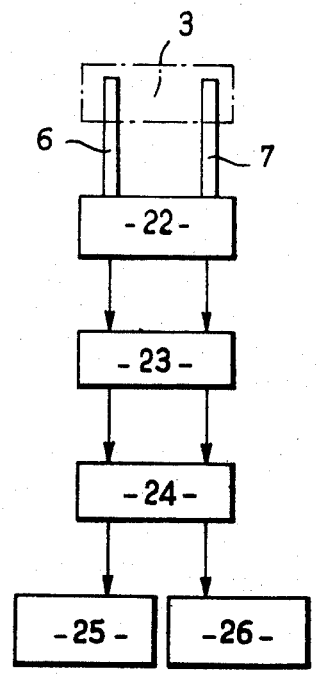
FIG_5

4,636,698

AUTOMATIC DEVICE FOR ACTUATION OF COMPONENTS TO CLEAN A MOTOR VEHICLE WINDOW

TECHNICAL FIELD

This invention relates to a device for cleaning motor vehicle windows. The device provides for automatic cleaning of automobile glass, especially a back window, when sufficient dirt has accumulated to limit the light exposed through the window to a photosensitive device.

BACKGROUND INFORMATION

Although the present invention can be adapted to clean a windshield or any vehicle window, its greatest advantage is achieved in use on a rear window.

When a motor vehicle operator sees a reduction in visibility through the windshield, he instinctively turns on its cleaning components such as the windshield washer and wiper.

However, an operator is less sensitive to a reduction in visibility through the rear window because his attention and view are primarily directed forward to look out for on-coming traffic.

Therefore, it would be advantageous to be able to rely on a device which would automatically clean the rear windows of vehicles which are so dirty that visibility may be impaired or blocked.

The present invention will achieve this result using the following technique.

Two comparable photosensitive elements are placed on or in the laminated glass of a rear window so that they receive light through the glass. The photosensitive element which receives light directly is much more sensitive to the degree of dirtiness of the glass than the other photosensitive element protected from direct exposure to light and which receives only that portion of the light transmitted by the interior of the glass.

The second photosensitive element serves as reference for measuring the difference in response of the two photosensitive elements. Thus, when the difference in response exceeds a given threshold indicative of the degree of dirtiness incompatible with good visibility, an electronic circuit responsive to this difference actuates the glass cleaning components.

When the necessary cleaning has been performed, the first photosensitive element or measuring element provides a response or indication such that the actuating potential to the electronic circuit is no longer maintained. At this point, the cleaning components are deactivated.

To properly acheive the desired result, the first photosensitive element should be placed in the sweeping field of the wiper.

SUMMARY OF THE INVENTION

The present invention relates to an automatic device for actuation of the cleaning components, such as wipers, for motor vehicle glass. The glass to be cleaned is equipped with two photosensitive elements positioned so that they are influenced by the light going through the glass. The first photosensitive element is positioned to receive light directly; the second element is isolated from any direct light and only receives light transmitted along the inside of the glass. The device also includes an electronic circuit to receive and compare the responses of the two photosensitive elements and means to control the cleaning components automatically when the difference between response of the two elements exceeds a certain threshold.

The automatic action of the cleaning components may be calibrated. Therefore, the threshold may, for example, be set only to clean a totally dirty back window.

When the swept part of the glass becomes clean after a certain period of wiper operation, the wiper stops operating. However, the unswept part of the glass remains opaque. A signal is displayed on the dashboard reminding the driver to finish cleaning the back window at the first opportunity.

The photosensitive elements used in the present invention are various types: photoconductive cells or photodiodes. When the extremely thin photodiodes are used and laminated glass is available, the photodiodes can be incorporated and buried in the plastic interlayer between the two glass sheets which make up, with the interlayer, the laminated glass, as is described in my patent application, entitled "Laminated Glass with Photosensitive Element and Automatic Device for Turning on and off Light of Motor Vehicle", application Ser. No. 06/779,406 filed Sept. 24, 1985.

It is also an object of the invention to use an improved glass equipped with two photosensitive elements which can be mounted on a vehicle for easy connection of the output terminals of the photosensitive elements to an electronic circuit which effects the desired automatic action.

When the vehicle includes, as is the case at times, an on-board computer, this computer can be used to accomplish the automatic action.

The invention will be better understood with the aid of the following description, given only by way of example, and made with reference to the accompanying drawings.

BRIEF DESCRIPTION OF THE DRAWINGS

FIG. 2 is a front view of a glass provided with the detection system of FIG. 1.

FIG. 4 is a cross section of a laminated glass provided with another embodiment of the detection system for an automatic device for cleaning a motor vehicle window.

FIG. 5 is a block diagram of an automatic device for cleaning a motor vehicle window combined with an automatic device for turning on and off the vehicle lights.

DESCRIPTION OF THE PREFERRED EMBODIMENT

Figure 1:
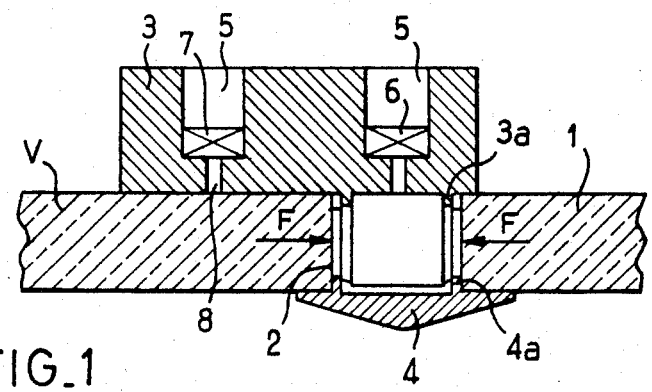
FIG. 1 is a cross section of a detection system for an automatic device for cleaning a vehicle window according to the present invention.

FIG. 1 depicts a first embodiment of a detection system for an actuation device for the cleaning components for automobile glass. FIG. 2 depicts a glass 1 provided with a detection system of FIG. 1. As shown in FIG. 1, a perforation 2 is made in the glass to receive a tubular projection 3a of support 3. Support 3 is positioned against the inside surface of the glass. Tubular projection 3a is covered by a skirt 4a which extends from of a button 4. Button 4 is positioned flat against the outside surface of the glass.

Support 3 has formed within it holes 5. At the bottom of these holes are fastened photosensitive elements 6 and 7. The sensitive faces of these elements are directed toward the bottom of the holes. Photosensitive element 6 is placed so that it is isolated from any direct light transmitted through the glass and receives only ambient light transmitted along the inside of the glass in the directions indicated by arrows F. For this purpose, the photosensitive element 6 is positioned in hole 5 covered by button 4 which provides the screen function for the direct light. Photosensitive element 6 is therefore the reference element.

Photosensitive element 7 is positioned in hole 5 on an axis offset in relation to the axis of button 4. Photosensitive element 7 receives light directly through the glass. It is the measuring element. The photosensitive elements 6 and 7 receive light through support 3 by orifice 8 bored in the bottom of holes 5. The cross section of these orifices is used to calibrate the amplitude of the response of each photosensitive element.

As shown in FIG. 2, measuring photosensitive element 7 is positioned in zone 9 located in the field of action of the cleaning components in the present example, a wiper 10. In this position, measuring photosensitive element 7 provides a response based on the cleanliness of the glass 1, both before and after the cleaning operation.

Positioning of the reference photosensitive element 6 does not affect the desired result. However, as will be shown, the choice of its position can contribute certain advantages.

Figure 3:
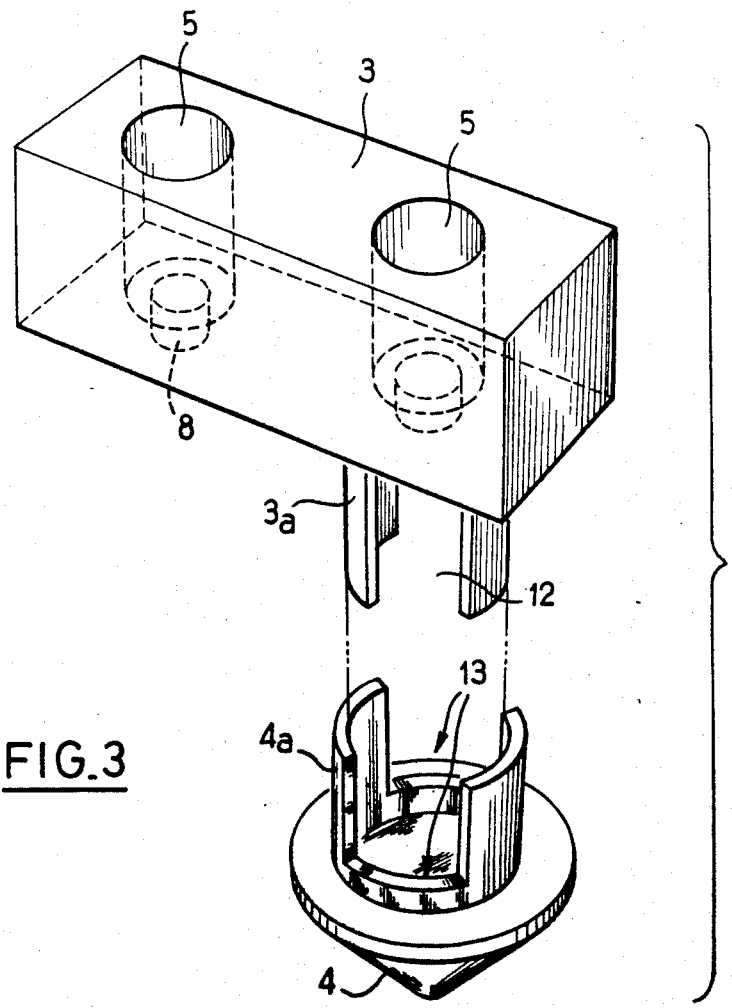
FIG. 3 is a perspective view of the support for the detection system of FIG. 1.

The means for fastening the support of the detection system to the glass will now be described in greater detail by reference to FIG. 3.

Support 3 is applied to the interior of the glass 1. Tubular projection 3a from the surface of support 3, has a diameter which fits into skirt 4a of button 4. The outside diameter of skirt 4a is almost equal to the diameter of hole 2 which houses it.

To permit light transmitted along the inside of the glass to influence reference photosensitive element 6, two diametrically opposite slots 12 are made axially in tubular projection 3a of support 3. During mounting, these slots are aligned with two diametrically opposite slots 13 made in skirt 4a of button 4.

Since the photosensitive elements are to be influenced only by the light going through the glass, the support 3 should be impervious to light on its periphery and fit the profile of the glass snugly. For this purpose, a flexible elastomer seal (not shown) can be placed on the face of the support to be applied against the glass. When the seal is crushed against the glass, it will assume the shape of the glass. To obtain a precise measurement, the measuring photosensitive element should be placed as close as possible to the glass.

A second embodiment of the detection system of this invention is shown in FIG. 4. The photosensitive elements 14 and 15 of this second system are photodiodes incorporated and buried in a plastic interlayer 16 positioned between two glass sheets 17 which form, with the interlayer, a laminated glass V. Such glass is described in my patent application, entitled "Laminated Glass with Photosensitive Element and Automatic Device for Turning on and off Light or Motor Vehicle", application Ser. No. 06/779,406, filed Sept. 24, 1985.

To isolate the reference photodiode from direct light going through the laminated glass V, the diode is placed in that part of glass V mounted in seal J. The diode is preferably placed in the part of seal J located in the upper half of the lateral post of the support for the glass. The measuring photodiode 14 receives light directly through the glass. Photosensitive elements 14 and 15 are connected to the outside by conductors 19 and terminals 20. Conductors 19 and their terminals 20 are folded along an edge 21 of the laminated glass, then along one of glass sheets 17, so that terminals 20 are accessible for connection to any suitable electronic device.

In this second embodiment, the photodiodes are positioned in a manner identical with that of the preceding example in relation to the field of action of the cleaning components and obtain the same results regarding actuation of those components.

As a variant, photodiode 15 can be mounted outside the part of the glass mounted in seal J. In this case, it is protected from direct light by an opaque pellet 18 (shown in broken lines on FIG. 4) on the outside surface of the glass opposite the sensitive face of the photodiode.

Again, with reference to FIG. 2, it is seen that the reference photosensitive element is placed in zone 11 outside of the field of action of the wiper, making it possible by a reversal in the response of the photosensitive element in the field of action of the wiper to indicate to the driver that zone 11 outside of the field should be cleaned manually as soon as possible. This indication, for example, is given by means of an indicator light located on the dashboard whose control is described below.

As previously indicated, the automatic device for actuating the cleaning components for the glass includes an electronic circuit for receiving and comparing the output signals of the two photosensitive elements and automatic control means placed in parallel with the manual control circuit of the cleaning components.

As shown in FIG. 5, the electronic circuit of this invention includes a current-voltage converter 22 whose inputs are connected to sensors 6 and 7 and whose outputs are connected to an analog-to-digital converter 23. The outputs of the analog-to-digital convertor 23 are connected to the inputs of a microprocessor 24 whose outputs are connected, in the present example, to a circuit 25 for controlling the lighting of the vehicle and a circuit 26 for controlling the operation of cleaning components 10. In the present example, the eletronic circuit makes it possible, by circuit 25, to actuate the lighting components as a function of the output signal of measuring photosensitive element 7 in the manner described in my patent application, entitled "Laminated Glass with Photosensitive Element and Automatic Device for Turning on and off Lights of a Motor Vehicle", application Ser. No. 06/779/406, filed Sept. 24, 1985.

Figure 6:
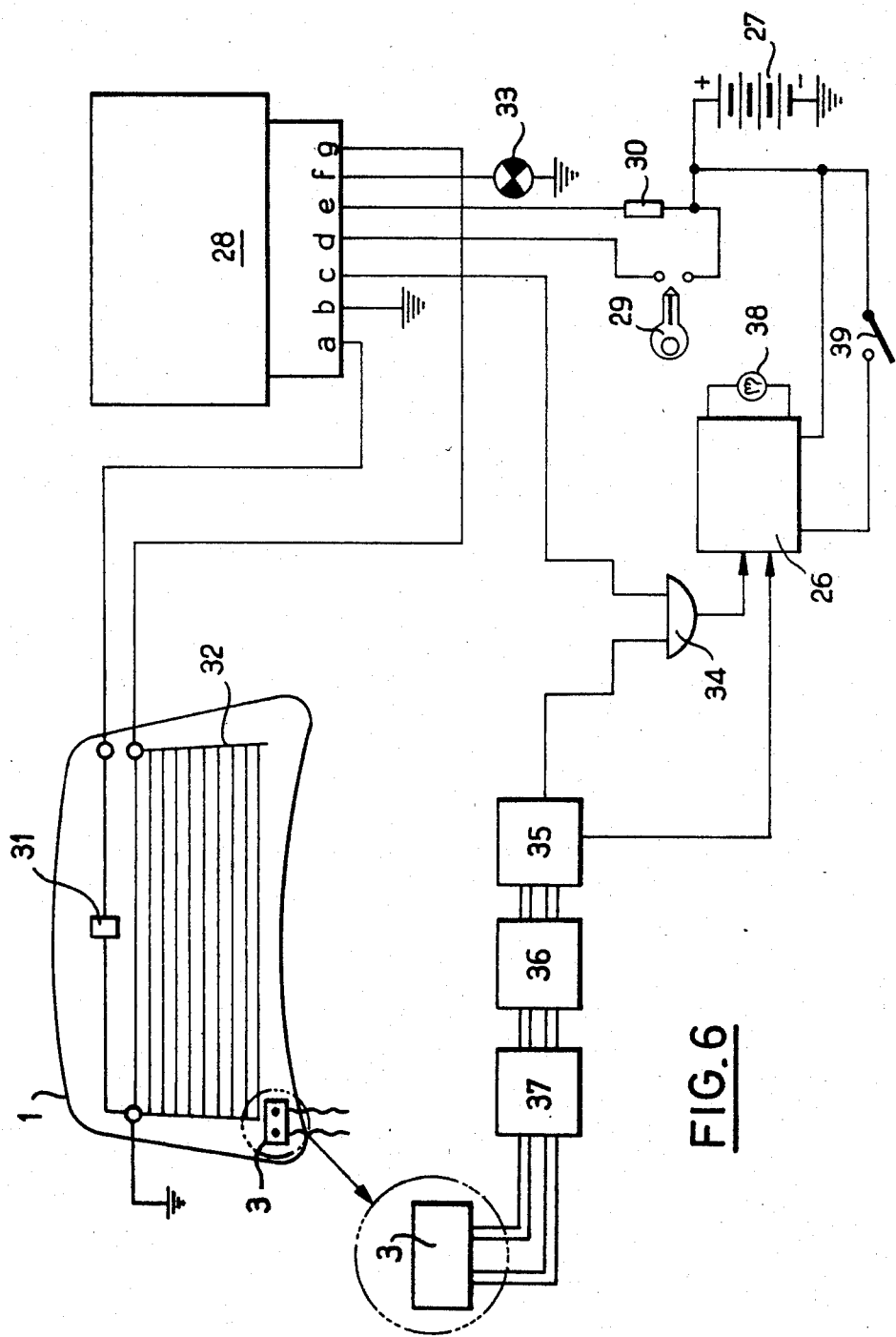
FIG. 6 is a block diagram of an automatic device for cleaning a motor vehicle window combined with an automatic defroster.

FIG. 6 shows a circuit diagram in which the automatic device for actuation of the cleaning components is combined with a device for automatic control of heating of automobile glass, such as described in the French patent No. 2,218,710. The unit shown in FIG. 6 is fed by a battery 27 and includes an electronic module 28 connected to the battery by its terminals b, d and e. Connection to terminal d is made through switch 29. Connection to terminal e is made through a fuse 30. Input a of electronic module 28 is connected to a terminal of condensation detector 31. Detector 31 is located on glass 1. The other terminal of detector 31 is connected to heating network 32 on glass 1 and also to the negative pole of battery 27.

As a variant, a standard temperature probe could be used instead of detector 31. Such probe could consist of a simple thermostatic contact controlled, for example, by a bimetallic strip which closes when the temperature is below 0° C. and would be mounted in parallel with the main control device. Heating network 32 is connected to terminal g of the electronic module. Terminal f of the module is connected to heating indicator light 33. Terminal c of the module is connected to the input of AND gate 34. The other input of AND gate 34 is connected to the output of a comparator 35 and its output is connected to an input of control circuit 26. Comparator 35 has as its inputs the outputs of an analog-to-digital converter 36. The inputs of connecter 36 are the outputs of a current-voltage converter 37 which has as its inputs the outputs of photosensitive elements 6 and 7 placed on glass 1.

An output of comparator 35 and the output of AND gate 34 are connected to the corresponding inputs of control circuit 26 which includes an indicator light 38. Indicator 38 is located, for example, on the vehicle dashboard.

Control circuit 26 is in parallel with switch 39 for manual control of the cleaning components and is fed by battery 27.

Functioning of the device that has just been described is as follows.

When glass 1 is clean over its entire surface, cleaning components 10 are not actuated; the amplitude difference, corresponding to this state, between the output signal of reference cell 6 and of measuring cell 7 is, for example, at most 3 millivolts.

When a glass is dirty over its entire surface, the amplitude difference exceeds a certain threshold and is, for example, 13 millivolts. In this event, the comparator, through AND gate 34 and control circuit 26, allows actuation of the cleaning components 10 subject to the following condition. Functioning of the cleaning components can be prevented when a layer of frost or snow covers glass 1. Since such functioning could cause deterioration of the wiper, the cleaning components can be actuated only when output c of electronic module 28 applied to the other input of AND gate 34 indicating that the glass surface state will permit cleaning. If frost covers the glass, the cleaning components will only be actuated at the end of defrosting by heating network 32 which is also controlled automatically. When cleaning is performed, the difference between the output signals of sensors 6 and 7 diminishes below the required threshold and the cleaning components stop.

However, zone 11 of the glass located outside of the field of action of wiper 10 remains dirty. As indicated above and shown in FIG. 2, the reference cell is placed in zone 11 of the glass. After cleaning of zone 9 by the wiper, a reversed amplitude difference of the output signals of reference cell 6 and cell 7 is obtained, for example, - 10 mV. This difference of sign opposite to the differences of preceding responses appears at the other output of comparator 35 which controls lighting of indicator light 38 indicating to the driver that he should finish cleaning the rear window by hand.

It is possible to combine the three automatic lighting, heating and cleaning devices by an on-board computer, for example.

I claim:

1. An automatic device for actuating elements for cleaning motor vehicle glass, comprising two photosensitive elements placed on the glass to be cleaned so that they are influenced by the light going through said glass, the first photosensitive element being positioned ro receive light directly through the glass, the second photosensitive element being isolated from any direct light transmitted through the glass and influenced only by the light transmitted through the inside of said glas, said device further comprising an electronic circuit to receive and compare the responses of said photosensitive elements and means to control the cleaning compoents automatically when the difference in response of said photosensitive elements exceeds a certain threshold.

2. An automatic device as claimed in claim 1, wherein the photosensitive element receiving direct light is located in the field of action of the wiper and acts as a measuring element, and the photosensitive element receiving only the light transmitted by the inside of the glass and is located outside of said field and acts as a reference element.

3. An automatic device as claimed in claim 2, wherein the photosensitive elements are photodiodes with a thickness such that they are buried in the plastic interlayer of a laminated glass and the reference photosensitive element is protected from direct light by being mounted in the part of said glass mounted in the side seal for said glass.

4. An automatic device as claimed in claim 2, wherein the reference photosensitive element is protected from direct light by a cover located on the outside of the vehicle against the glass opposite said reference photosensitive element and forming a screen for direct light.

5. An automatic device as claimed in claim 2, wherein a support located on the inside of the vehicle holds the two photosensitive elements, the sensitive face of said photosensitive elements turned toward the glass, and a cover, located on the outside of the vehicle against the glass opposite the reference photosensitive element, forms a screen for the direct light.

6. An automatic device as claimed in claim 5, wherein a perforation is made in the glass to allow the passage of holding components of a support member and of a button screen, said holding components being formed to include openings allowing passage of light transmitted by the inside of the glass to the reference photosensitive element.

7. An automatic device as claimed in claim 6, wherein the holding components of the support and buttom consist of a tubular projection and a skirt which can be fitted together so that diametrically opposite and corresponding passages on said tubular projection and said skirt can be aligned.

8. An automatic device as claimed in claim 5, wherein the photosensitive elements are introduced in holes in the support and said support includes windows for said photosensitive elements, the section of which corresponds to the amount of light desired to influence said photosensitive elements.

9. An automatic device as claimed in claim 1, wherein the electronic circuit comprises a current-voltage converter, an analog-to-digital converter and a comparison means connected to the circuit for controlling the operation of the cleaning components.

10. An automatic device as claimed in claim 9, wherein the comparison means is a comparator incorporated in a microprocessor.

11. An automatic device as claimed in claim 9, wherein the measuring photosensitive element provides actuation of a circuit for controlling the lighting of the vehicle.

12. An automatic device as claimed in claim 9, wherein the comparison means is connected to the circuit for controlling the operation of the cleaning components by an AND gate, one input of which is a means for detecting the surface state of the glass or the outside temperature so that functioning of the cleaning component is inhibited in the presence of a layer of frost or snow on said glass.

13. An automatic device as claimed in claim 9, wherein the comparison means actuates after cleaning a component for indication visible to the user of the degree of dirtiness of the zone of the glass located outside of the field of action of the cleaning components.

* * * * *